United States Patent
Saumer et al.

(10) Patent No.: US 10,804,058 B2
(45) Date of Patent: Oct. 13, 2020

(54) MODULAR SAFETY RELAY CIRCUIT FOR THE SAFE CONTROL OF AT LEAST ONE MACHINE

(71) Applicant: SICK AG, Waldkirch (DE)

(72) Inventors: Markus Saumer, Waldkirch (DE); Jonas Weidenmüller, Waldkirch (DE)

(73) Assignee: SICK AG, Waldkirch (DE)

( * ) Notice: Subject to any disclaimer, the term of this patent is extended or adjusted under 35 U.S.C. 154(b) by 321 days.

(21) Appl. No.: 15/941,382

(22) Filed: Mar. 30, 2018

(65) Prior Publication Data

US 2018/0286610 A1 Oct. 4, 2018

(30) Foreign Application Priority Data

Mar. 31, 2017 (EP) .................................. 17164188

(51) Int. Cl.
*H01H 47/00* (2006.01)
*G05B 9/02* (2006.01)
*H01H 3/02* (2006.01)

(52) U.S. Cl.
CPC ............ *H01H 47/002* (2013.01); *G05B 9/02* (2013.01); *H01H 47/005* (2013.01); *H01H 3/022* (2013.01); *H01H 2300/052* (2013.01)

(58) Field of Classification Search
CPC .... H01H 47/002; H01H 47/005; H01H 3/022; H01H 2300/052; G05B 9/02
See application file for complete search history.

(56) References Cited

U.S. PATENT DOCUMENTS

| | | | |
|---|---|---|---|
| 6,661,320 B1 * | 12/2003 | Fausch ................. | H01H 50/002 335/129 |
| 2008/0079318 A1 * | 4/2008 | Burr ..................... | H01H 47/005 307/115 |
| 2016/0002005 A1 * | 1/2016 | Richter ................ | B66B 5/0031 187/289 |

FOREIGN PATENT DOCUMENTS

| | | |
|---|---|---|
| DE | 102010037714 B3 | 1/2012 |
| EP | 2015341 A1 | 1/2009 |
| EP | 2720414 A1 | 4/2014 |
| WO | 2008/131703 A1 | 11/2008 |

OTHER PUBLICATIONS

European Search Report dated Sep. 28, 2017, for counterpart EP application No. 17164188.9.

* cited by examiner

*Primary Examiner* — Jue Zhang
(74) *Attorney, Agent, or Firm* — Nath, Goldberg & Meyer; Jerald L. Meyer

(57) ABSTRACT

To enable a safe monitoring with a small cabling effort of a modular safety relay circuit, a modular safety relay circuit for the safe control of at least one machine is provided comprising a safety relay unit that has at least one forcibly guided relay for the safe switching on and off of the machine and that generates output signals in dependence on input signals, wherein the input signals are provided by at least one connected signal transmitter and the output signals are communicated to the at least one machine; and at least one expansion relay unit for providing additional output connectors so that additional machines can be connected; wherein the expansion relay unit has at least one respective forcibly guided relay for the safe switching on and off of the machine and is monitored by means of a monitoring signal.

9 Claims, 2 Drawing Sheets

MODULAR SAFETY RELAY CIRCUIT FOR THE SAFE CONTROL OF AT LEAST ONE MACHINE

Figure 1:
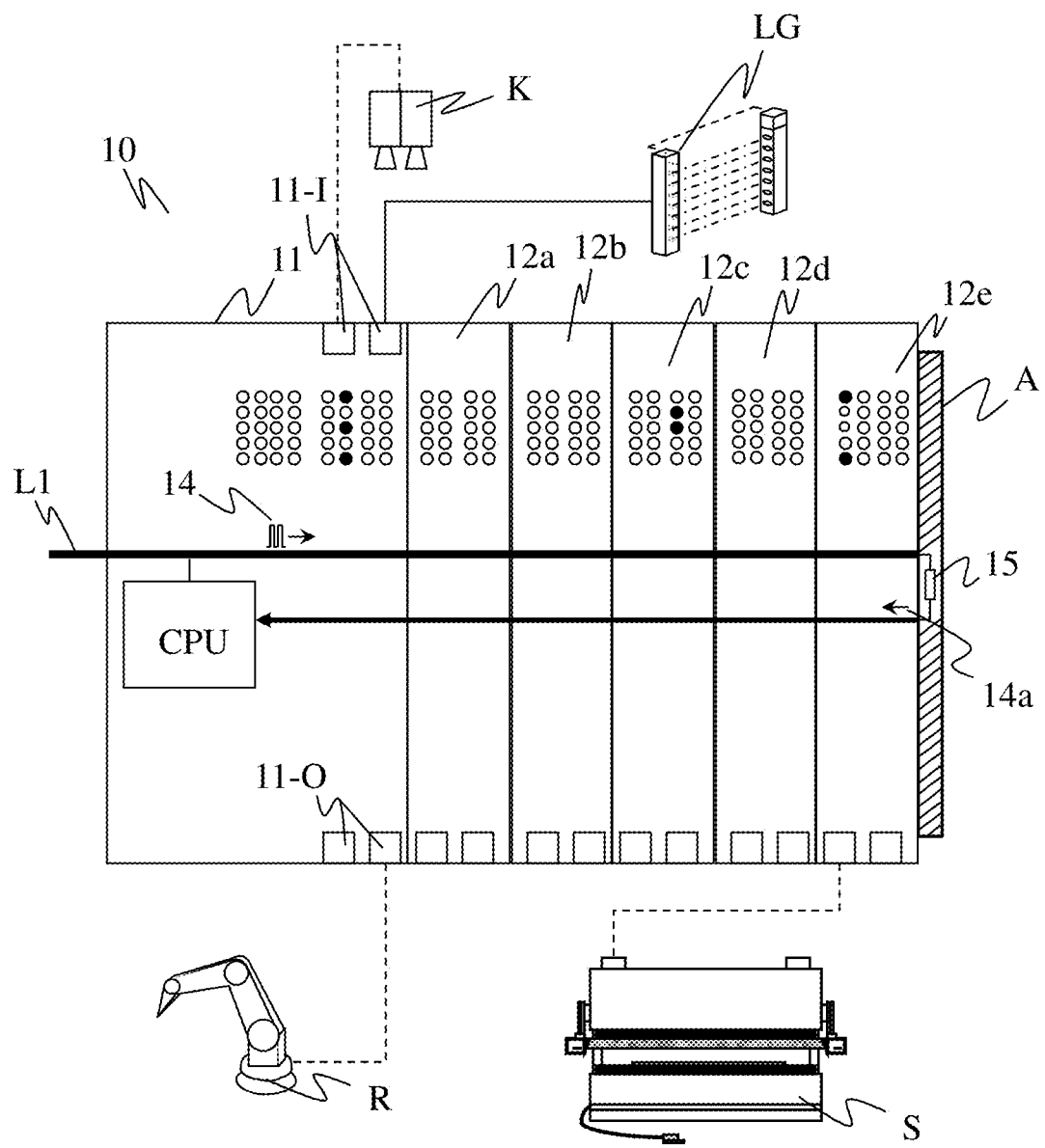

The invention relates to a modular safety relay circuit for the safe control of at least one machine in accordance with claim 1.

In today's automation industry, a total plant is autonomously controlled by at least one safety control such that the machine carries out the work assigned it and optionally interacts with another machine. In this respect, the total plant has to have a sufficient safety level against possible injury to persons despite a high degree of automation and accordingly has to satisfy the specifications of the standard EN ISO 13849, for example.

To satisfy the high safety specifications, an environment of the machine, a position and/or a movement of the machine are monitored by means of sensors, for example, with the safety control actuating at least one safety relay unit that switches the machine off on an unintended operating state.

The safety relay unit is generally known and has input connectors and output connectors. The safety relay unit receives input signals at the input connectors, with the input signals being provided by at least one connected signal transmitter and with output signals being communicated to the at least one machine via the output connectors, with the output signals being prepared by a control unit of the safety relay unit in dependence on the input signals.

The safety relay unit additionally has at least one control winding that closes or opens switches in the form of, for example, closers or openers so that a power supply of the machine can be switched on or off by means of the switches. In this respect, on an actuation of the safety relay unit, the control winding is supplied with voltage so that it builds up a magnetic field that actives the switches to close or to open and thus activates the relay contacts.

In the event of a need for further output connectors in order, for example, to connect further machines to expand the total system, at least one expansion relay unit having corresponding output connectors and relays can be connected to the safety relay unit. The safety relay unit and the expansion relay unit are electrically connected to one another. In this manner, a plurality of expansion relay units can be connected to the safety relay unit, with the openers of the expansion relay units being connected in series to one another.

To achieve the specified safety level, the control unit of the safety relay unit checks a cabling of the total system and in particular all the connected switches for a sort circuit or a "stuck at" fault. This means that the forcibly guided relays are monitored for perfect operational readiness, in particular for opening failure. In this respect, the opener contacts of the forcibly guided relays of the expansion relay units are monitored by means of a monitoring signal by the safety relay unit so that the safety relay unit can determine a fault-free function of the relay contacts or a short-circuit in the cabling with reference to a comparison between the monitoring signal and a returned monitoring signal or a return signal.

This known kind of wiring of the monitoring of the relays has the disadvantage that the cabling of the relays of the expansion unit to one another is very complex due to the expansion of the total system.

On a wiring error of the monitoring circuit, there can furthermore be the result that a premature return of the monitoring signal is produced so that the downstream relays are not taken into consideration in the monitoring. In other words, the control unit of the safety relay unit incorrectly detects a perfect operational readiness of the relays even though the monitoring signal is returned prior to the last relay of an expansion relay unit and the further relays of the subsequent expansion relay units are not checked.

It is therefore an object of the invention to provide a modular safety relay circuit for a safe control of a at least one machine with which a safe monitoring is possible with a small cabling effort.

The object is satisfied in accordance with the invention by a modular safety relay circuit for the safe control of at least one machine having a safety relay unit that has at least one forcibly guided relay for the safe switching on and off of the machine and that generates output signals in dependence on input signals, wherein the input signals are provided from at least one connected signal transmitter and the output signals are communicated to the at least one machine, and having at least one expansion relay unit for providing additional output connectors so that additional machines can be connected, wherein the expansion relay unit has a respective at least one further forcibly guided relay for the safe switching on and off of the machine, the expansion relay unit is monitored by means of a monitoring signal for a malfunction by the safety relay unit, and the expansion relay unit connected as the last in the series has a cover that has at least one electrical element having a defined resistance value and that provides a return of a return signal corresponding to the defined resistance value to the safety relay unit.

In accordance with a preferred embodiment, the safety relay unit comprise a control unit that detects and evaluates the return signal corresponding to the defined resistance value. In doing this, the control unit recognizes a cabling fault of the modular safety relay circuit, in particular a cable breakage, a welding of a working contact of the relay or similar with reference to a deviation of the detected return signal from the return signal corresponding to the defined resistance value. This means that the advantage results that the control unit of the safety relay unit can reliably exclude a non-monitoring of the expansion relay units connected after the above-mentioned wiring fault with reference to the deviation between the detected return signal and the return signal corresponding to the defined resistance value.

Furthermore, in accordance with a preferred embodiment, the electrical element comprises a resistor, a capacitor, or a combination of the two. The cover can hereby be implemented with the defined resistance value simply and inexpensively.

In accordance with a further preferred embodiment, the cover terminates the connected expansion relay unit electrically and mechanically. The cover in accordance with the invention hereby has the advantage that a return of the monitoring signal is possible in a very simple manner. A very simple structural design of a closure of the modular safety relay circuit can in particular be achieved.

In accordance with a further preferred embodiment, each expansion relay unit comprises an electrical sink that respectively has a defined resistance value at a return channel of the returned return signal. The defined resistance value of the respective sink of the control unit of the safety relay unit is in particular known. A number of the connected expansion modules can advantageously be determined by the control unit of the safety relay unit with reference to a sum of the resistance values at the return channel. The advantage hereby results that the exact number of the connected expansion relay units of the safety relay unit is always present exactly with reference to the resistance value.

In accordance with a further preferred embodiment, each expansion relay unit comprises a separate housing having electrical terminals that are provided at both side walls of the housing. The advantage hereby results that the expansion relay units can be plugged simply to the safety relay unit by plug & play and the return for the monitoring circuit can be simply established by the cover and a secure fault determination can be ensured.

Figure 2:
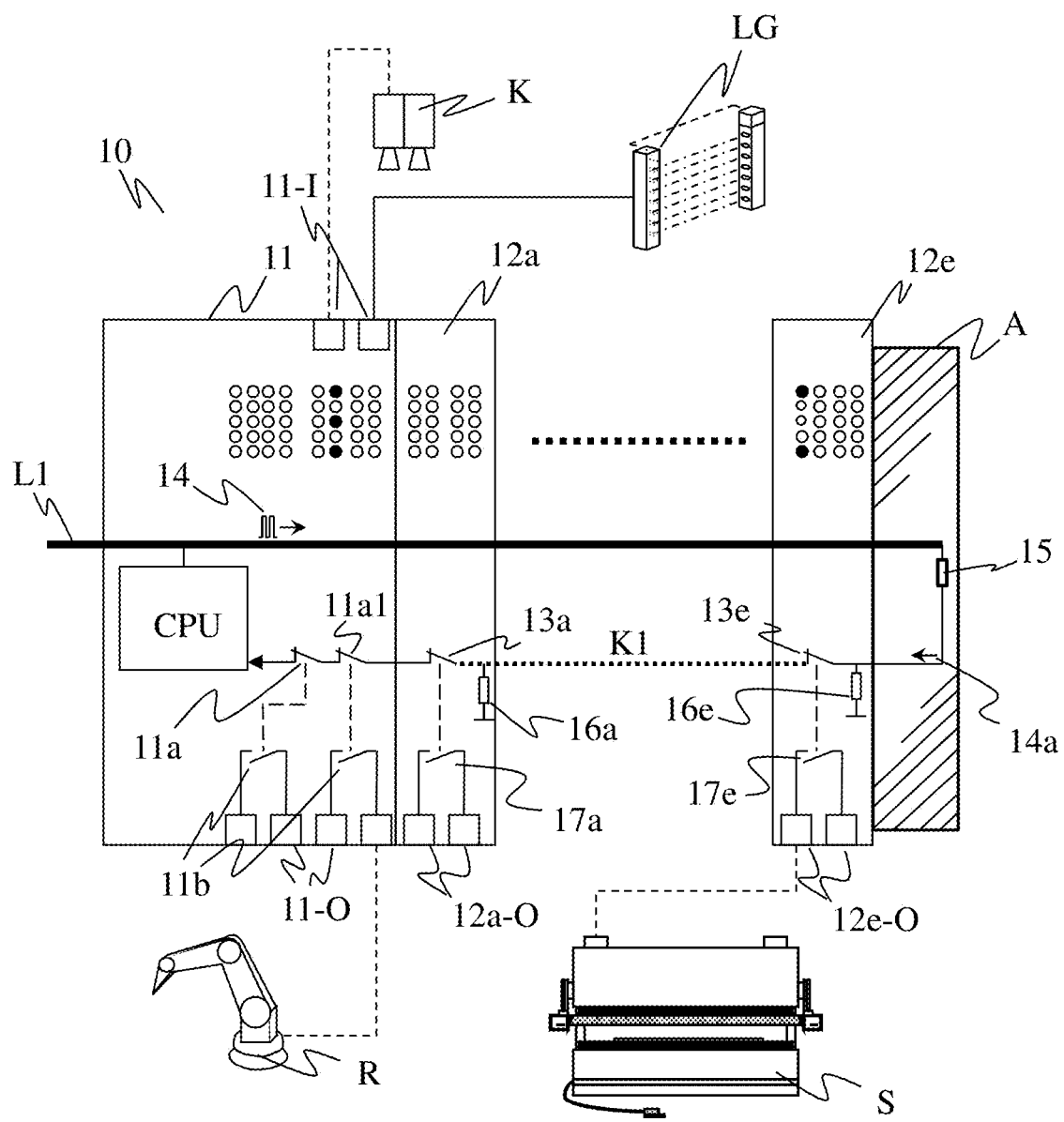

The invention will also be explained in the following with respect to further advantages and features with reference to the enclosed drawing and to embodiments. The Figures of the drawing show in:

FIG. 1 a schematic representation of a modular safety relay circuit in accordance with the invention in an automation plant; and FIG. 2 a schematic, detailed representation of the modular safety relay circuit in accordance with the invention.

FIG. 1 schematically shows an automation plant that is built up of a modular safety relay circuit 10 in accordance with the invention and of two machines controlled by the safety relay circuit 10. The safety relay circuit 10 switches a load circuit on or off that supplies the machines, shown by way of example as a robot arm R and as a punch S, with energy.

The safety relay circuit 10 comprises a safety relay unit 11 and, in the embodiment shown, five expansion relay units 12a, 12b, 12c, 12d, and 12e, wherein two signal transmitters in the form of a camera K and of a light grid LG are connected to input connectors 11-I of the safety relay unit 11. The camera K and the light grid LG serve to secure a working environment of the robot arm 10 connected to the safety relay circuit 10, with the robot arm R being connected to an output connector 11-O of the safety relay unit 11.

To be able to provide the safety relay unit 11 with additionally required output connectors for connecting additional machines such as the punch S, the further five expansion relay units 12a-12 are connected to the safety relay unit 11, with the punch S being connected to an output connector of the fifth expansion relay unit 12e.

In this respect, each expansion relay unit 12a-12e has a separate housing having electrical connectors that are provided at both side walls of the housing so that the expansion relay units 12a-12e can be simply laterally plugged to one another and to the safety relay unit 11. The safety relay unit 11 and the expansion relay units 12a-12e are hereby electrically connected to one another so that the expansion relay units 12a-12e are monitored by means of a monitoring signal 14 for a malfunction by the safety relay unit 11.

In accordance with the invention, the expansion relay unit 12e connected as the last in the series has a cover A that provides a return of the monitoring signal or of a return signal 14a to the safety relay unit 11 and has at least one electrical element 15 having a defined resistance value. At least one monitoring circuit is hereby prepared by the safety relay unit 11 over all the expansion relay units 12a-12e up to the cover A and back to the safety relay unit 11, wherein the return signal 14a is formed in accordance with the defined resistance value of the electrical element 15.

A schematic, detailed representation of the safety relay unit 11 and of the exemplary expansion relay units 12a and 12e of the modular safety relay circuit 10 in accordance with the invention is shown in FIG. 2.

The safety relay unit 11 has the input connectors 11-I and the output connectors 11-O. The camera K and the light grid LG are connected as signal transmitters to the input connectors 11-I and provide input signals to the control unit CPU of the safety relay unit 11. The safety relay unit 11 has at least one forcibly guided relay, with the relay serving to interrupt the load circuit to the robot arm R in the event of a fault so that the robot arm R can be switched off. In this respect, the control unit CPU of the safety relay unit 11 generates output signals in dependence on the input signals of the signal transmitters and communicates the output signals to the relay or to the robot arm R.

The forcibly guided relay of the safety relay unit 11 in the embodiment shown comprises two openers 11a and 11a1 and two closers 11b, with the closer 11b interrupting the load circuit to the robot arm R in the case of a fault. The openers 11a and 11a1 serve for the monitoring of the perfect operational readiness of the closers 11b, in particular an opening failure of the closers 11b, and are connected electrically in series in the monitoring circuit.

The expansion relay units 12a-12e are electrically connected to the safety relay unit 11 to provide the safety relay unit 11 with more output connectors 12a-O to 12e-O, with the punch S, for example, being connected to the output connector 12e-O of the expansion relay unit 12e and being controlled by the safety relay unit 11. The safety relay unit 11 supplies all the expansion relay units 12a and 12e with voltage via a line L1.

Each expansion relay unit 12a-12e has a respective at least one forcibly guided relay having openers 13a to 13d and closers 17a to 17e, with only the openers 13a and 13e and the closers 17a and 17e of the expansion relay units 12a and 12e being shown. The closers 17a and 17e of the expansion relay units 12a and 12e switch the machines connected to the output connectors 12a-O and 12e-O of the expansion units 12a and 12e on and off—in the case of the expansion relay unit 12e is it the punch S.

The cover A in accordance with the invention that terminates the modular safety relay circuit 10 both electrically and mechanically is plugged to the expansion relay unit 12e connected as the last in the series. The cover A here comprises at least one electrical element 15 that has a defined resistance value that is clearly distinguished from a short circuit by the control unit CPU of the safety relay unit 11. The electrical element 15 can comprise a resistor, a capacitor, or a combination of the two.

At least one monitoring circuit from the safety relay unit 11 over the expansion relay units 12a and 12d to the cover A and back to the safety relay unit 11 is provided by means of the electrical element 15 of the cover A. The monitoring circuit is formed from the control unit CPU of the safety relay unit 11, from the line L1, from the electrical element 15 of the cover A, and from the openers 13a to 13e of the expansion relay units 12e and 12a so that a first monitoring channel K1 is provided for the modular safety relay circuit 10.

This means that the control unit CPU of the safety relay unit 11 transmits a monitoring signal 14, for example in the form of a 24V voltage, over the line L1, said monitoring signal being returned via the monitoring channel K1, in particular the electrical element 15 of the cover A and the openers 13a to 13e of the expansion relay units 12e and 12a, in the form of the return signal 14a corresponding to the resistance value of the electrical element 15.

On the monitoring of the operational readiness of the modular safety relay circuit 10, the control unit CPU detects the returned return signal 14a of the monitoring channel K1 and compares the detected return signal 14a with the return signal 14a to be expected that corresponds to the defined resistance value of the electrical element 15 so that the safety relay unit 11 can determine a short circuit of the line of the modular safety relay circuit 10 or a welding of the closers 11b, 17a, and 17e with reference to a difference between the detected return signal 14a and the expected return signal 14a.

In accordance with the invention, the safety relay unit 11 can reliably determine the above-mentioned return signal 14a to be expected with reference to a defined change of the monitoring signal 14 by the defined resistance value of the electrical element 15 of the cover A that the monitoring channel K1 has been completely run through on the monitoring.

For example, in the case of a wiring fault at the expansion relay unit 12a that has been caused by mechanical overload such as bent contacts or unpermitted contaminants, the monitoring signal 14 can already be returned to the safety relay unit 11 at the expansion relay unit 12a so that the further expansion units 12b to 12e are no longer in the monitoring circuit or so that the further expansion relay units 12b to 12e are no longer monitored.

Since, however, the monitoring signal 14 returned over the expansion relay unit 12a is not the same as the return signal 14a corresponding to the defined resistance value of the electrical element 15 of the cover A, the safety relay unit 11 reliably determines this fault state in accordance with the invention so that the safety relay unit 11 can react accordingly.

In other words, the safety relay circuit 10 in accordance with the invention can reliably identify both a short circuit and a welding of the closers 11b, 17a to 17e, in particular the above-mentioned fault case, by the monitoring of the return signals 14 resulting from the defined resistance value of the electrical element 15.

In addition, each expansion relay unit 12a and 12e in accordance with the embodiment shown comprises an electrical sink 16a and 16e at the at least one monitoring channel K1 of the return signal 14a, said sink comprising, for example, a resistor, a capacitor, or a combination of the two. An electrical sink 16a and 16e is here understood as an electrical element here that takes up electrical energy.

Each electrical sink 16a and 16e has a defined resistance value that is known to the control unit CPU of the safety relay unit 11 and that preferably differs from the defined resistance values of the electrical elements 15.

On the connection of each expansion relay unit 12a-12d, the return signal 14a changes in accordance with the number of sinks 16a and 16e. The change of the return signal 14a defined by the sinks 16a and 16e enables the safety relay unit 11 to exactly determine how many expansion relay units 12a-12e are connected to the safety relay unit 11.

In other words, each sink 16a and 16e changes the magnitude of the return signal 14a to a defined degree like the electrical element 15 of the cover A so that a number of the connected expansion modules 12a-12e can be exactly determined by the safety relay unit 11 with reference to a sum of the resistance values of the sinks 16a and 16e at the return channel K1.

REFERENCE NUMERAL LIST 10 modular safety relay circuit
11 safety relay unit
11a, opener of the safety relay unit
11b closer of the safety relay unit
11-I input connector of the safety relay unit
11-O output connector of the safety relay unit
12a-12e expansion relay unit
12a-O, 12e-O output connector of the expansion relay unit
13a, 13e openers of the expansion relay unit
14 monitoring signal
14a, return signal
15 electrical element
16a, 16e electrical sink
17a, 17e closers of the expansion relay unit
A cover
CPU control unit
K camera
K1 return channel
L1 line
LG light grid
R robot arm
S punch

The invention claimed is:

1. A modular safety relay circuit for the safe switching on and off of at least one machine, the modular safety relay circuit comprising:
   a safety relay unit that has at least one forcibly guided relay for the safe switching on and off of the machine and that generates output signals in dependence on input signals, wherein the input signals are provided by at least one connected signal transmitter and the output signals are communicated to the at least one machine; and
   at least one expansion relay unit for providing additional output connectors so that additional machines can be connected, wherein the at least one expansion relay unit has at least one respective forcibly guided relay for the safe switching on and off of the machine; the at least one expansion relay unit is monitored by means of a monitoring signal for a malfunction by the safety relay unit; and the expansion relay unit connected as the last has a cover that has at least one electrical element having a defined resistance value and provides a return of a returned return signal corresponding to the defined resistance value to the safety relay unit.

2. The modular safety relay circuit in accordance with claim 1, wherein the safety relay unit comprises a control unit that detects and evaluates the returned return signal corresponding to the defined resistance value of the electrical element.

3. The modular safety relay circuit in accordance with claim 1, wherein the electrical element comprises a resistor, a capacitor, or a combination of the two.

4. The modular safety relay circuit in accordance with claim 1, wherein the cover electrically and mechanically terminates the connected expansion relay unit.

5. The modular safety relay circuit in accordance with claim 1, wherein each expansion relay unit comprises an electrical sink that respectively has a defined resistance value at a return channel of the returned return signal.

6. The modular safety relay circuit in accordance with claim 5, wherein the defined resistance value of the respective sink is known to the control unit of the safety relay unit.

7. The modular safety relay circuit in accordance with claim 5, wherein a number of the connected expansion relay units can be determined by the control unit of the safety relay unit with reference to a sum of the resistance values at the return channel.

8. The modular safety relay circuit in accordance with claim 5, wherein the resistance value of the sink differs from the defined resistance value of the electrical element of the cover.

9. The modular safety relay circuit in accordance with claim 1, wherein each expansion relay unit comprises a separate housing having electrical connectors that are provided at both side walls of the housing.

* * * * *